United States Patent [19]

Sarnelli, Jr.

[11] 4,033,229
[45] July 5, 1977

[54] TOOL FOR ENLARGING THE BORE IN A WORKPIECE

[76] Inventor: Charles Sarnelli, Jr., 4 Hilltop Terrace, Staten Island, N.Y. 10304

[22] Filed: May 11, 1976

[21] Appl. No.: 685,299

[52] U.S. Cl. .............................. 90/12 R; 30/104; 51/245; 144/205
[51] Int. Cl.² ...................... B23C 1/20; B23C 3/02
[58] Field of Search ............ 90/12 R, 12 D, 15 A; 82/4 C; 144/205; 30/104; 51/90, 241 A, 241 B, 245

[56] References Cited

UNITED STATES PATENTS

| | | | |
|---|---|---|---|
| 2,304,405 | 12/1942 | Green | 90/12 |
| 2,535,587 | 12/1950 | McGoreen et al. | 51/245 |
| 2,546,490 | 3/1951 | Baldwin et al. | 51/245 |
| 3,114,292 | 12/1963 | Harris et al. | 90/12 D X |
| 3,141,365 | 7/1964 | Peters | 90/12 X |

FOREIGN PATENTS OR APPLICATIONS 565,931 12/1932 Germany .................... 90/12

Primary Examiner—Othell M. Simpson
Assistant Examiner—Z. R. Bilinsky
Attorney, Agent, or Firm—Bauer, Amer & King

[57] ABSTRACT

For enlarging the bore in a workpiece, the present invention provides a collar that can be secured to the workpiece with a plate rotatably mounted on the collar. A handle supports a housing in which a cutting tool is rotatably positioned. The cutting tool extends through a slot in the plate so that the handle may move the cutting tool from a first position within the workpiece and spaced from the bore thereof to a second position in engagement with the bore that is to be enlarged. Further rotation of the handle moves the cutting tool concentrically about the axis of the workpiece so that the bore may be enlarged to the desired size. Adjustable stop means are provided for accurately determining the second position of the cutting tool prior to the cutting tool being moved circumferentially. Various adapter means of different sizes may be employed for utilizing the present invention with workpieces having different, correspondingly sized, diameters.

22 Claims, 10 Drawing Figures

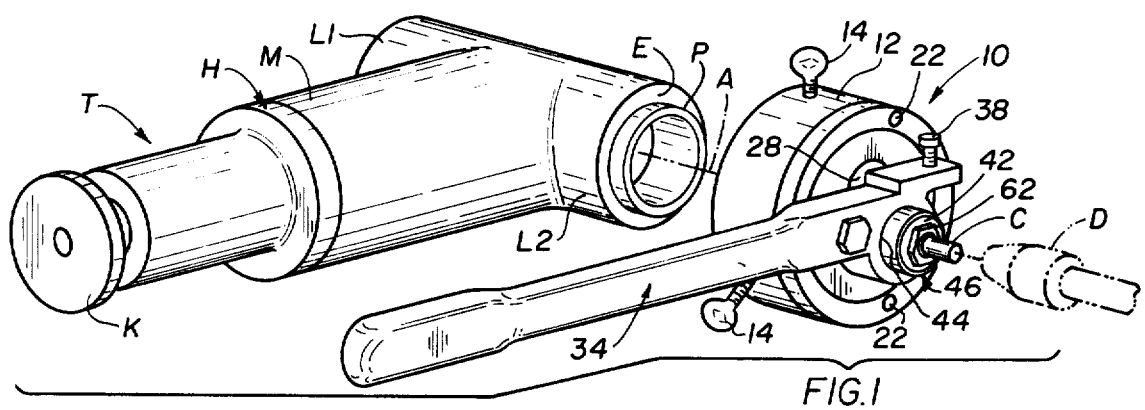
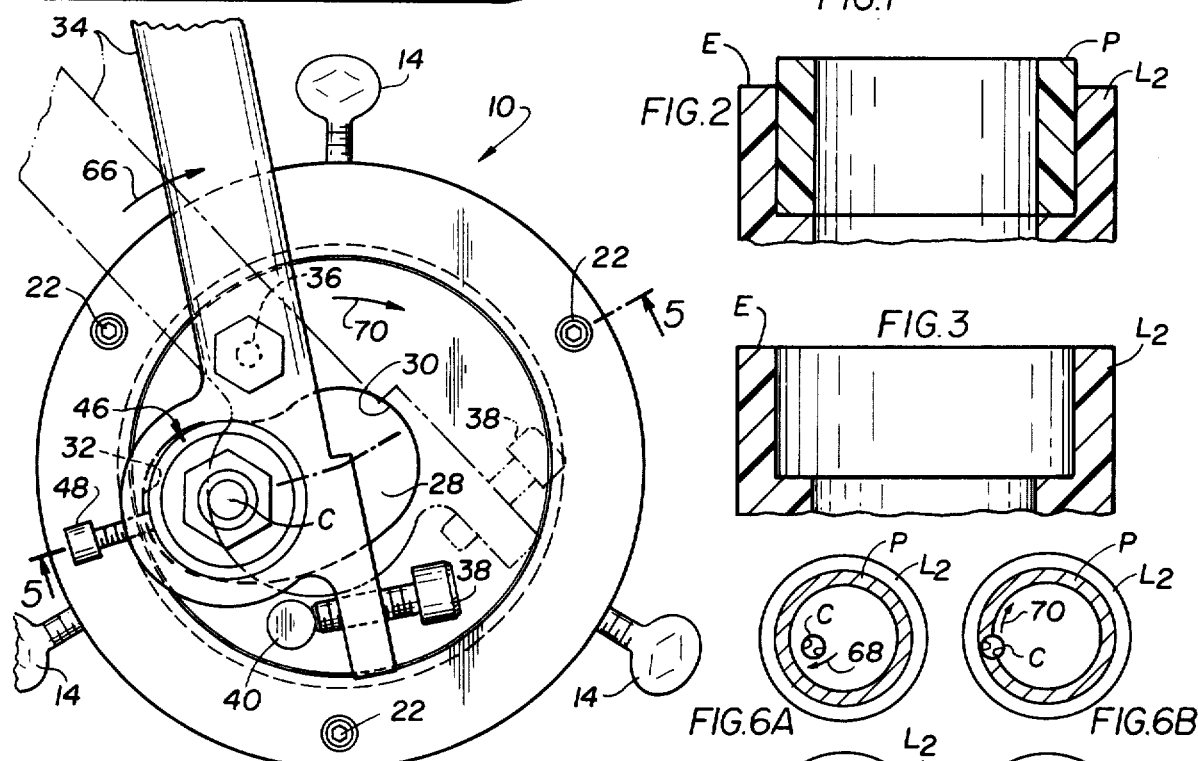
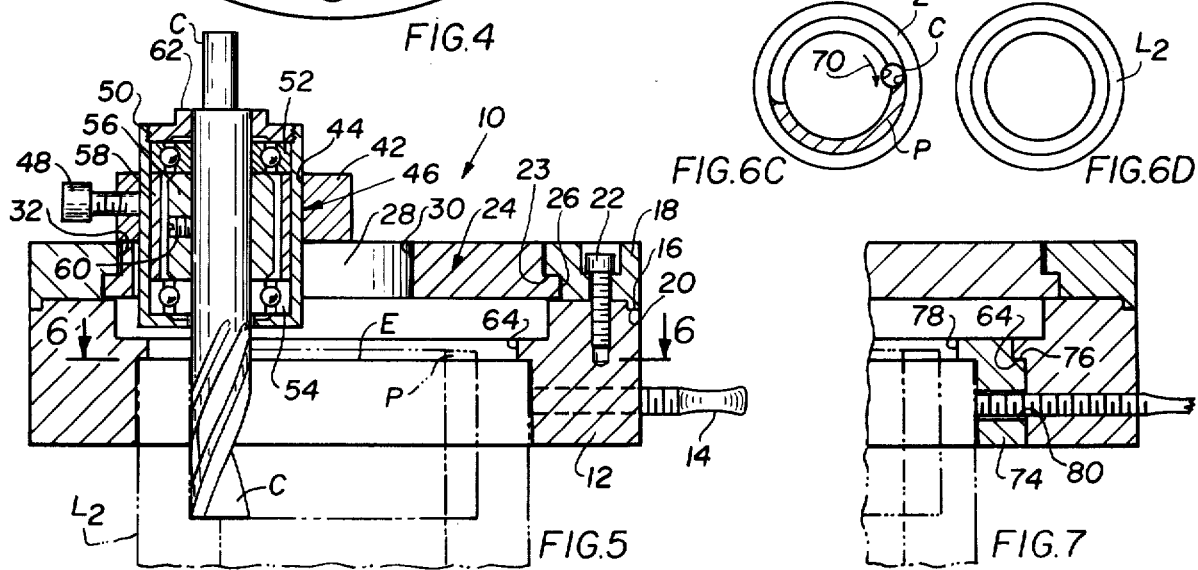

TOOL FOR ENLARGING THE BORE IN A WORKPIECE

BACKGROUND OF THE INVENTION

This invention relates generally to the machine tool arts. More particularly, the present invention relates to a portable tool that may be secured to a workpiece for enlarging the bore thereof.

The utility of the present invention may best be appreciated in an environment such as plastic valves, fixtures, fittings, etc. wherein it is necessary to remove lengths of pipe which are frequently adhesively secured therein. It should be particularly noted, however, that the present invention is not so limited and this particular environment is used for purposes of illustration only.

There are many examples of prior art structure that are directed generally to the basic function as the present invention. For example, it is frequently necessary to recondition the bore of a cylinder in an engine in order to remove ridges formed by piston wear. One example of just such a device is disclosed in U.S. Pat. No. 2,304,405 granted on Dec. 8, 1942, to E. D. Green. In the Green patent, there is disclosed structure which includes means that are to be mounted on the cylinder such that the cutting tool may enter the cylinder. The cutting tool is mounted in a housing and is adjustably positionable by means of an eccentric arrangement so that when the teeth of the cutting tool and a pair of guide means contact the side wall, the ridges formed by piston wear can be removed. The pair of guide means are normally positioned below the ridge that is to be removed in order to prevent further cutting when the proper quantity of material has been cut. Vertical adjustment of the cutting tool is also provided in the Green patent.

While the Green patent does permit eccentric adjustment of the cutting tool, there is no disclosure of a pivotal handle for carrying the cutting tool, nor is there any disclosure of a plate that rotates relative to a clamp that is secured to the workpiece for guiding the cutting tool concentrically with respect to the bore of the workpiece. It should be further noted that it is relatively difficult to adjust for a change in depth of cut in a radial direction with the structure disclosed by Green. Still another shortcoming of the Green device is that provisions are not made that will permit adaptation of the tool to cylinders having different outside diameters.

Another form of prior art structure is disclosed in U.S. Pat. No. 2,917,976 granted on Dec. 22, 1959, to E. G. Stovall et al. The patent granted to Stovall et al. may be considered to be in the same general field to which the present invention is directed in that Stovall et al. teach structure for bevelling the end of a pipe. The Stovall et al. structure provides a constant bevel on the pipe end even when the pipe is out of round. In order to provide the constant bevel, the Stovall et al. machine utilizes a small arc of the pipe being cut. The arc positions the machine and changes as the cut progresses about the pipe. Stovall et al. provides means for movably engaging the end of a pipe that is being bevelled and for limiting the movement of the machine in the direction endwise of the pipe such as would move the cutter to deeper cutting engagement. Spacers movably engage the inner and outer wall of the pipe in order to position the machine laterally relative to the section of the end of the pipe that is being bevelled. One group of the spacers engages both the interior and the exterior walls of the pipe immediately adjacent the cutter while other groups of the spacers engage the inner and outer wall surfaces at points that are spaced circumferentially about the pipe.

From the foregoing, it will be appreciated that the Stovall et al. structure, while it might alter the interior dimension of a pipe if the bevel is cut deeply enough, does not provide means for removing an appreciable quantity of material from the interior wall surface in an axial direction. Furthermore, the Stovall et al. structure does not enlarge the bore of the pipe even though it does bevel the end of the pipe. It will be appreciated that even if the bevel does start from the interior surface of the pipe, the inside diameter of the pipe will always remain the same.

U.S. Pat. No. 3,141,365 granted to J. B. Peters on July 21, 1964, discloses structure that is mountable on a flanged workpiece and which provides means for centering the axis of a lathe spindle with respect to the workpiece. The Peters structure primarily provides means for refacing the flange of a workpiece such as a large diameter steam pipe. A cutting tool is provided on structure that can be moved diametrically with respect to the longitudinal axis of the pipe and circumferentially or rotationally with respect to the longitudinal axis of the pipe. It will be appreciated from a reading of the Peters patent that means are not provided for accurately removing a finite quantity of material from the interior wall of the pipe with the removed material extending for an appreciable length in the axial direction with respect to the length of the pipe.

SUMMARY OF THE INVENTION

In order to overcome the shortcomings found in the prior art and in order to eliminate the deficiencies of the prior art, the present invention provides a collar that may be readily secured to one end of a cylindrical member by means of fasteners. A plate is rotatably mounted on and secured to the collar by means of a cap. In the assembled condition, the plate overlays the bore in the pipe that is to be reworked and is provided with a slot in which is positioned a tool receiving housing such that a cutting tool such as an end mill that is positioned in the housing will extend into the pipe. A handle that is pivotally mounted on the plate is arranged to move the housing as well as the tool from a first position that may be generally centrally located with respect to the longitudinal axis of the pipe (but in any event spaced inwardly from the inside surface of the pipe) to a second position that is in cutting contact with the interior surface of the pipe. Because the plate is rotatably captured on the collar and the tool receiving housing is positioned within the slot, the handle may then be used to move the cutting tool housing as well as the cutting tool along an arcuate, circumferential path that is concentric with the longitudinal axis of the pipe. In this manner, the cutting tool will be able to remove material over an arc of at least 360°.

A feature of the present invention is the provision of cooperating stop means on the plate and on the handle that serve to quickly and accurately position the cutting tool with respect to the interior surface of the fitting from which the pipe material is to be removed. The stop means in one embodiment of the present invention comprises a pin rigidly secured to the rotatable plate and a fastener that is threaded through a portion of the handle into abutment with the pin. Thus, a deeper or shallower cut may be readily achieved merely by rotating the screw in either direction in order to permit either more or less pivotal movement of the cutting tool housing from the first position to the second position.

Another feature of the present invention is the provision of means for adjusting the position of the cutting tool housing axially with respect to the pipe. This is achieved by a set screw arrangement that is threaded into a boss which is integral with the plate and into engagement with the cutting tool housing. Thus, the precise length of material removal in an axial direction may be achieved. In order to permit adaptation of the present invention to a variety of pipe diameters, a series of insert sleeves or adapters may be provided which are positioned between the exterior surface of the pipe and the interior surface of the collar.

It is, therefore, an object of the present invention to provide improved means for removing material from the internal surface of a pipe or other tubular workpiece.

Another object of the present invention is to provide an improved device, as described above, that may be readily mounted on different diameter pipes.

Still another object of the present invention is to provide a device, as described above, wherein means are included for accurately setting the depth of cut.

Yet another object of the present invention is to provide a device, as described above, for rapidly and accurately changing the depth of cut.

A further object of the present invention is to provide a device, as described above, that permits the removal of a first tubular member from within a second tubular member without damaging the second tubular member.

A further object of the present invention is to provide a device, as described above, wherein the axial extent of a circumferential cut may be readily varied.

The above description, as well as further objects, features and advantages of the present invention, will be more fully appreciated by reference to the following detailed description of a presently preferred, but nonetheless illustrative embodiment in accordance with the present invention when taken in conjunction with the accompanying drawings.

BRIEF DESCRIPTION OF THE DRAWINGS

In the drawings, wherein the same reference numeral denotes the same element throughout the several views:

FIG. 1 is an exploded perspective view with a portion thereof in phantom illustrating an embodiment of the present invention being used to remove a length of pipe from a T-shaped valve housing;

FIG. 2 is a fragmentary, sectional elevational view illustrating a portion of the T-shaped valve housing together with a portion of the pipe that is to be removed therefrom;

FIG. 3 is a fragmentary, sectional elevational view, similar to FIG. 2, but with the pipe section having been removed by the operation of the present invention;

FIG. 4 is a plan view of the present invention with a portion thereof shown in phantom outline denoting a second position;

FIG. 5 is a sectional elevational view taken along line 5—5 of FIG. 4;

FIGS. 6A–6D are schematic plan views, taken along line 6—6 of FIG. 5 illustrating the several steps in the operation of the structure comprising the present invention; and FIG. 7 is a fragmentary, sectional elevational view similar to FIG. 6, but illustrating an alternative embodiment of the present invention.

DETAILED DESCRIPTION OF THE INVENTION

As mentioned hereinabove, one possible application of the present invention is in the removal of a length of adhesively secured pipe from the housing of a T-shaped valve and for that reason the present invention will be described in that particular environment. However, it should be clearly understood that the present invention has a broader scope and may be used for enlarging the bore of a tubular, cylindrical member regardless of the application of the member.

As is well known, it is a normal practice to adhesively secure a length of plastic pipe in the housing of a T-shaped plastic valve, for example. When the plastic pipe is cut off in order to modify the pipeline or when the pipeline is damaged for any reason, it is highly desirable to salvage the used fittings or housing and valves. The present invention provides structure for accomplishing this end result even when the valves are in place on a pipeline. Moreover, the present invention can effectively remove a damaged pipeline or a pipeline that must be modified even when the valve is closed such as when it is in actual use in order to stop the flow of a particular substance in the pipeline. The present invention is light, portable, accurate and can be powered by a portable electric drill.

With this in mind, reference may now be had to FIG. 1 wherein there is shown a valve T having a T-shaped housing H comprising a valve adjusting knob K, a main leg L and two further legs $L_1$ and $L_2$ which are at right angles thereto. A fragment of a length of pipe P is shown adhesively secured to the leg $L_2$ in FIG. 1 and in FIG. 2 as well. It is the length of pipe P that is to be removed by the present invention so that the end of the leg $L_2$ will appear as shown in FIG. 3.

The present invention, which is generally designated by the reference character 10, is comprised of a collar 12 that is secured to the leg $L_2$ (see FIG. 5) by means of fasteners 14. Preferably three fasteners 14 are utilized for more accurately centering the collar 12 with respect to the axis A of the legs $L_1$ and $L_2$.

The collar 12 is provided with a peripheral seat 16 on one transverse end surface thereof in order to receive a retainer 18 having a peripheral lip 20 that is received in the seat 16. The retainer 18 is secured to the collar 12 by means of a plurality of fasteners 22. The retainer 18 is further provided with a radially inwardly directed lip 23 that is axially spaced apart from the top surface of the collar 12.

As shown best in FIG. 5, a plate, generally designated by the reference character 24, is rotatably secured on the collar 12 by means of peripheral, radially outwardly extending lip 26 that is positioned in the space between the lip 23 of the retainer 18 and the upper surface of the collar 12. The plate 24 is further provided with a cutout or opening 28 which, in the embodiment illustrated, is arcuate about the center of 36.

For purposes to be described hereinafter, the arcuate cutout 28 has a first, radially inner end 30 that is, for purposes of illustration, approximately centrally located with respect to the longitudinal axis of the pipe P. The arcuate cutout 28 has a second end 32 that is radially outward of the first end 30 and is positioned proximate the periphery of the plate 24.

A handle, generally designated by the reference character 34, is pivotally mounted on the upper surface of the plate 24 by means of a pin 36. As shown best, for example, in FIG. 4, the pin 36 is located radially outwardly in one direction of the center of the plate 24. In the opposite radial direction, the end of the handle 34 is provided with an adjustable screw fastener 38 therethrough that is adapted to abut a post 40 that is integrally secured to the top surface of the plate 24. The threaded fastener 38 and the post 40 define, in combination, stop means for limiting the arcuate movement of the handle 34 in a manner to be described more fully hereinafter.

The handle 34 is further provided with a boss 42 having a bore 44 therein for receiving a cutting tool retaining housing generally designated by the reference character 46. The housing 46, which is secured to the boss 42 in an axially adjustable manner by means of a set screw 48, comprises a cup-shaped shell 50 in which are positioned upper and lower bearings 52 and 54, respectively. Inner and outer rings 56 and 58, respectively, maintain the bearings 52 and 54 in axially spaced apart relationship. In addition, a set screw 60 which is threaded through the inner ring 56, is arranged to bear against and retain a cutting tool C which may be in the form of an end mill. The cutting tool C may be coupled to the chuck of a portable hand drill D (FIG. 1). A cap 62 is threaded into the open, upper end of the shell 50 in order to retain assembled the bearings 52 and 54 as well as the inner and outer rings 56 and 58.

In operation, the collar 12 is first clamped to the leg $L_2$ utilizing the three fasteners 14. It will be particularly noted in FIG. 5 that a radially inwardly directed lip 64 overlays the transverse end face E of the leg $L_2$. Initially the handle 34 may be located at a first position which is shown in phantom outline in FIG. 4 as radially closest to the center of the tool 10. The axial position or cutting length of the cutting tool C is then adjusted utilizing the set screw 48 which enables variable positioning of the cutting tool retaining housing 46 with respect to the boss 42. The handle 34 may then be moved in a clockwise direction as shown by the arrow 66 in FIG. 4 so that the cutting tool retaining housing 46 also moves in a clockwise direction as shown by the arrow 68 in FIG. 6A from the end 30 of the slot 28 in a direction towards the end 32 of the slot 28. When the screw 38 abuts the post 40, the cutting tool C will be at the proper radial distance from the axis of the pipe P and from the axis of the leg $L_2$ to assure complete removal of the pipe fragment P as shown in FIG. 3 when the cutting tool C is driven by the drill D. The cutting tool C will then be in the position shown in FIG. 6B. Continued rotation of the handle 34 in a clockwise direction will cause the cutting tool retaining housing 46 to bear against the side wall of the slot 28 and will thereby drive the plate 24 in a clockwise direction as shown by the arrow 70 in FIG. 4 and in FIG. 6B. FIG. 6C illustrates the position of the cutting tool C after it has traversed an arc of approximately 180° while FIG. 6D illustrates the condition of the pipe P after an arc of 360° has been traversed. The same condition is shown in FIG. 3.

Turning now to FIG. 7, there is illustrated an embodiment of the present invention that may be utilized with cylinders having different outside diameters. One or more sleeve-like adapters 74 having a range of inside diameters conforming to the range of outside diameters of the cylindrical members is provided. Each adapter 74 includes an external, peripheral seat 76 that is adapted to receive the radially inwardly directed lip 64 of the collar 12. Each adapter 74 is further provided with a radially inwardly directed lip 78 that is arranged to overlay the transverse end face E of the cylindrical member. The adapter 74 is also provided with a plurality of openings 80 through which the fasteners 14 may pass in order to clamp the device 10 to the workpiece. Thus, with a range of adapters 74 of different sizes, a comparable range of pipe diameters may be accommodated.

While a specific embodiment of the present invention has been described and illustrated, it should be understood that various modifications and changes may be made thereto. For example, the slot 28 need not necessarily be arcuate providing it is sufficiently oversized to permit free pivotal movement of the cutting tool retaining housing 46 therethrough and about the pivot 36. Furthermore, the handle 34 need not necessarily be limited to pivotal movement. It may, instead be displaced linearly providing only that the cutting tool retaining housing 46 is initially positioned radially inwardly of the surface of the material that is to be removed and is permitted to move in a direction towards and into engagement with the surface of the material that is to be removed. In such a case, it would be desirable to provide suitable guide means for controlling the movement of the cutting tool retaining housing from the first to the second position prior to the arcuate movement thereof in a circumferential direction as described above.

While there have been shown and described and pointed out the fundamental novel features of the invention as applied to a first embodiment thereof, it will be understood that various omissions and substitutions and changes in the form and details of the device illustrated and in its operation may be made by those skilled in the art without departing from the spirit of the invention. It is the invention, therefore, to be limited only as indicated by the scope of the claims appended hereto.

What is claimed is:

1. A device utilizing a cutting tool for enlarging the interior bore in a workpiece, said device comprising:
   collar means adapted to be rigidly mounted on the workpiece without relative rotation therebetween;
   a plate rotatably mounted on said collar means, said plate including a slot therethrough;
   a movable handle pivotally mounted on said plate;
   and cutting tool receiving means mounted on said handle for movement together therewith, said cutting tool receiving means being positioned in and movable along the length of said slot by said handle whereby a cutting tool contained in said cutting tool receiving means may be moved to a position against the surface of a bore that is to be enlarged and then moved along the bore surface through an arc that is concentric with the bore in the workpiece.

2. A device according to claim 1 wherein means are included for pivotally mounting said handle on said plate.

3. A device according to claim 2 wherein said slot is arcuate whereby said cutting tool receiving means traverses an arcuate path when moving to a position against the surface of the bore that is to be enlarged, the arcuate path of said cutting tool receiving means having a single, constant radius emanating from the rotational axis of said pivotal mounting means for said handle.

4. A device according to claim 1 wherein said plate includes integral stop means and said handle includes abutment means cooperating with said stop means for limiting the movement of said cutting tool receiving means in a direction towards the surface of the bore that is to be enlarged.

5. A device according to claim 4 wherein said abutment means is adjustably mounted on said handle.

6. A device according to claim 4 wherein said adjustment means is threaded into said handle and is thereby adjustable relative to said stop means whereby the position representing the limit of movement of said cutting tool receiving means, in a direction towards the surface of the bore that is to be enlarged, may be varied.

7. A device according to claim 1 further including retaining means for holding the plate on said collar means.

8. A device according to claim 7 further including fastener means for securing said retaining means to said collar means, said retaining means in combination with said collar means defining a channel for receiving a peripheral portion of said plate.

9. A device according to claim 8 wherein said collar means includes locating means cooperating with a surface of the workpiece for positioning said plate relative to the bore in the workpiece.

10. A device according to claim 9 wherein said collar means is a ring and said locating means comprises a lip extending inwardly from the inside surface thereof, said lip being arranged to abut the transverse end surface of the workpiece when the inside surface of said ring is closely adjacent the outside surface of the workpiece.

11. A device according to claim 9 wherein said collar means is a ring and wherein said locating means comprises a removable adapter sleeve sized to fit intermediate the inside surface of said ring and the outside surface of the workpiece, said adapter sleeve including first interfitting means for engaging a portion of said ring and second interfitting means for engaging a portion of the workpiece.

12. A device according to claim 11 wherein said first interfitting means comprises a radially inwardly extending lip on said ring and a cooperating seat on the outside surface of said adapter sleeve, said second interfitting means comprising a radially inwardly extending lip on said adapter sleeve that is arranged to engage the transverse end face of the workpiece.

13. A device according to claim 1 wherein said cutting tool receiving means comprises a housing, means for securing said housing to said plate for movement together therewith and means for supporting a cutting tool in said housing for rotation relative thereto.

14. A device according to claim 13 wherein said means for supporting the cutting tool for rotation relative to said housing comprises bearing means.

15. A device according to claim 13 wherein there is further included adjustment means for axially varying the position of the cutting tool with respect to the workpiece.

16. A device according to claim 15 wherein said adjustment means comprises fastener means for releasably securing said housing to said plate.

17. Cutting apparatus for at least partially removing a first tubular member that is rigidly secured internally of a second tubular member, said apparatus comprising:
a collar;
means for non-rotatably securing said collar to the second tubular member;
a plate rotatably mounted on said collar, said plate including an arcuate, elongated slot therethrough with one end of said slot terminating proximate the center of said plate and with the other end of said slot terminating proximate the periphery of said plate;
a handle pivotally mounted on said plate, the pivot axis of said handle defining the radius of said arcuate slot, said handle being further arranged to rotate said plate about the longitudinal axis of the first tubular member;
and a cutting tool receiving housing slidably received in said slot and coupled to said handle, said housing being arranged for movement along the length of said slot by said handle, said housing being further arranged to be rotated by said plate about the longitudinal axis of the first tubular member when said plate is rotated by said handle, said housing being on the same radius as said slot with respect to the pivot axis of said handle whereby the cutting tool extends through said slot and is arranged to be brought into cutting engagement with the inside surface of the first tubular member when said housing is moved through said slot by said handle.

18. Apparatus according to claim 17 further including means for limiting the pivotal movement of said handle in the direction of travel thereof whereby the position at which the cutting tool engages the inside surface of the first tubular member may be accurately determined.

19. Apparatus according to claim 18 wherein said limiting means comprises a projection extending from said plate into the path of said handle when said housing moves through said slot and an adjustable member secured to said handle and arranged to abut said projection at a position that corresponds to the desired position of the cutting tool.

20. Apparatus according to claim 19 wherein said adjustable member is in threaded mating engagement with said handle and is adapted to be axially displaced relative thereto.

21. Apparatus according to claim 17 wherein means are included for rotatably receiving the cutting tool in said housing.

22. Apparatus according to claim 17 wherein means are included for axially adjusting the position of the cutting tool relative to said housing.

* * * * *